(12) United States Patent
Kemppainen

(10) Patent No.: US 10,638,324 B2
(45) Date of Patent: Apr. 28, 2020

(54) METHOD AND FAKE BASE STATION FOR DETECTING SUBSCRIBER IDENTITY

(71) Applicant: EXFO Oy, Oulu (FI)

(72) Inventor: Jukka Kemppainen, Tyrnävä (FI)

(73) Assignee: EXFO OY, Oulu (FI)

( * ) Notice: Subject to any disclaimer, the term of this patent is extended or adjusted under 35 U.S.C. 154(b) by 0 days.

(21) Appl. No.: 16/424,751

(22) Filed: May 29, 2019

(65) Prior Publication Data

US 2019/0373473 A1 Dec. 5, 2019

(30) Foreign Application Priority Data

May 29, 2018 (EP) .................................... 18174859

(51) Int. Cl.
*H04W 12/12* (2009.01)
*H04W 12/10* (2009.01)
(Continued)

(52) U.S. Cl.
CPC ............. *H04W 12/12* (2013.01); *H04W 8/18* (2013.01); *H04W 12/0013* (2019.01);
(Continued)

(58) Field of Classification Search
CPC ..... H04W 12/02; H04W 12/12; H04W 4/023; H04W 12/08; H04W 12/1202;
(Continued)

(56) References Cited

U.S. PATENT DOCUMENTS 8,320,934 B2 * 11/2012 Sheynblat ............. G01S 5/0036
342/125
2013/0294266 A1 * 11/2013 Lim ...................... H04W 24/10
370/252

(Continued)

FOREIGN PATENT DOCUMENTS

EP 2733973 A2 5/2014
EP 3258719 A1 12/2017

OTHER PUBLICATIONS

Extended European Search Report issued in corresponding European Patent Application No. EP18174859, 3 pages (dated Oct. 24, 2018).

(Continued)

*Primary Examiner* — Dung Hong
(74) *Attorney, Agent, or Firm* — Buchanan Ingersoll & Rooney PC

(57) ABSTRACT

A method and fake base station for detecting subscriber identity are disclosed. The method includes: capturing at least one wireless message containing an encrypted subscriber identity of a fifth generation mobile phone system transmitted from a mobile subscriber apparatus; transmitting a reject message of the fifth generation mobile phone system for the mobile subscriber apparatus; capturing at least one wireless message of the fourth generation mobile phone system transmitted from the mobile subscriber apparatus; detecting an unencrypted subscriber identity from the at least one captured wireless message of the fourth generation mobile phone system; and transmitting a disconnect mes- (Continued)

Figure 1:
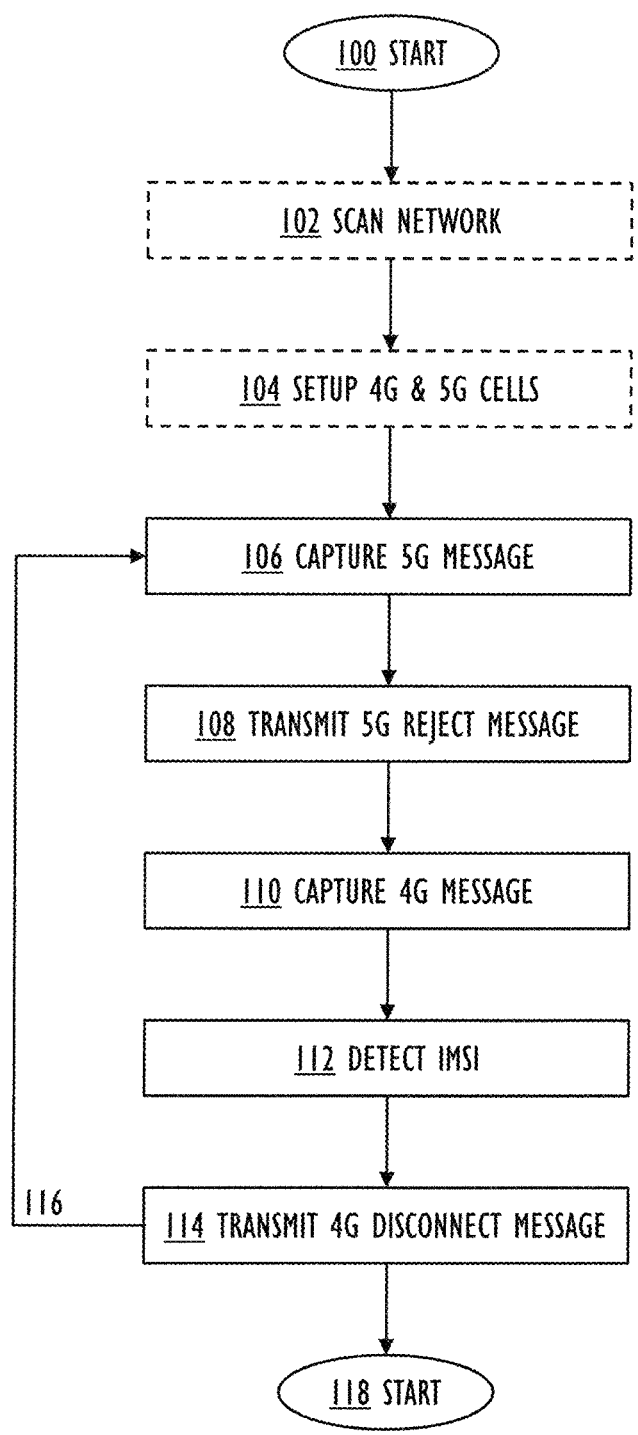

sage of the fourth generation mobile phone system for the mobile subscriber apparatus.

6 Claims, 2 Drawing Sheets

(51) Int. Cl.
*H04W 12/00* (2009.01)
*H04W 8/18* (2009.01)
*H04W 48/02* (2009.01)
*H04W 64/00* (2009.01)

(52) U.S. Cl.
CPC ....... *H04W 12/1006* (2019.01); *H04W 48/02* (2013.01); *H04W 64/006* (2013.01)

(58) Field of Classification Search
CPC ... H04L 63/304; H04L 63/30; H04L 63/1466; H04M 3/2281
See application file for complete search history.

(56) References Cited

U.S. PATENT DOCUMENTS

| | | | | |
|---|---|---|---|---|
| 2018/0248610 | A1* | 8/2018 | Faerber | H04B 7/0617 |
| 2019/0068651 | A1* | 2/2019 | Briggs | H04W 12/06 |
| 2019/0098502 | A1* | 3/2019 | Torvinen | H04L 9/321 |
| 2019/0124617 | A1* | 4/2019 | Jones | G01S 5/0252 |
| 2019/0165983 | A1* | 5/2019 | Nakayama | H04B 7/0413 |
| 2019/0182654 | A1* | 6/2019 | Jerichow | H04W 8/04 |
| 2019/0268950 | A1* | 8/2019 | Youtz | H04W 76/32 |

OTHER PUBLICATIONS

Nokia et al., "Home network authorization of serving network actions directed to the UE," 3GPP S3-180079-V2, 3rd Generation Partnership Project (3GPP), Gothenburg (Sweden), URL:http://www.3gpp.org/ftp/TSG_SA/WG3_Sec_urity/TSGS3_90_Gothenburg/Docs/S3-18007.

Unknown, "Non-Access-Stratum (NAS) functions related to Mobile Station (MS) in idle mode," (Release 15); 3GPP TS 23.122 V15.3.0, 3rd Generation Partnership Project (3GPP) Standard, Valbonne, France, pp. 1-58, (Mar. 2018).

Unknown, Non-Access-Stratum (NAS) protocol for 5G System (5GS); Stage 3 (Release 15); 3GPP TS 24.501 V1.1.1, 3rd Generation Partnership Project (3GPP) Standard, Valbonne, France, pp. 1-290, (May 2018).

Unknown, "Study on the security aspects of the next generation system," 3GPP TR 33.899, 3rd Generation Partnership Project (3GPP), Cedex, France, vol. SA WG3, No. VI.3.0, 21, XP051450230, Cover Page (Aug. 21, 2017).

* cited by examiner

METHOD AND FAKE BASE STATION FOR DETECTING SUBSCRIBER IDENTITY

FIELD

The invention relates to a method, and to a fake base station.

BACKGROUND

S A fake station is used to detect a subscriber identity. This procedure may be called IMSI catching. However, in recent mobile phone systems (5G) the subscriber identity is encrypted, whereby traditional detection methods do not work.

IMSI catching of LTE, UMTS and GSM mobile subscriber apparatuses is possible using a fake base station because LTE/UMTS/GSM mobile subscriber apparatuses respond to an identity request (IMSI) message sent by a fake base station. This approach is not possible for 5G mobile subscriber apparatuses because 3GPP standards prevent it. For example, the latest 5G NAS specification 24.501 v1.1.1 defines clearly that only IDENTITY REQUEST with SUCI is possible before integrity protection is activated. The 5G mobile subscriber apparatuses send always SUCI (Subscription Concealed identifier) which is encrypted, and, cannot be used to find out the subscriber identity.

BRIEF DESCRIPTION

The present invention seeks to provide an improved method and an improved fake base station.

According to an aspect of the present invention, there is provided a method as specified in claim 1.

According to another aspect of the present invention, there is provided a fake base station as specified in claim 6.

LIST OF DRAWINGS

Figure 2:
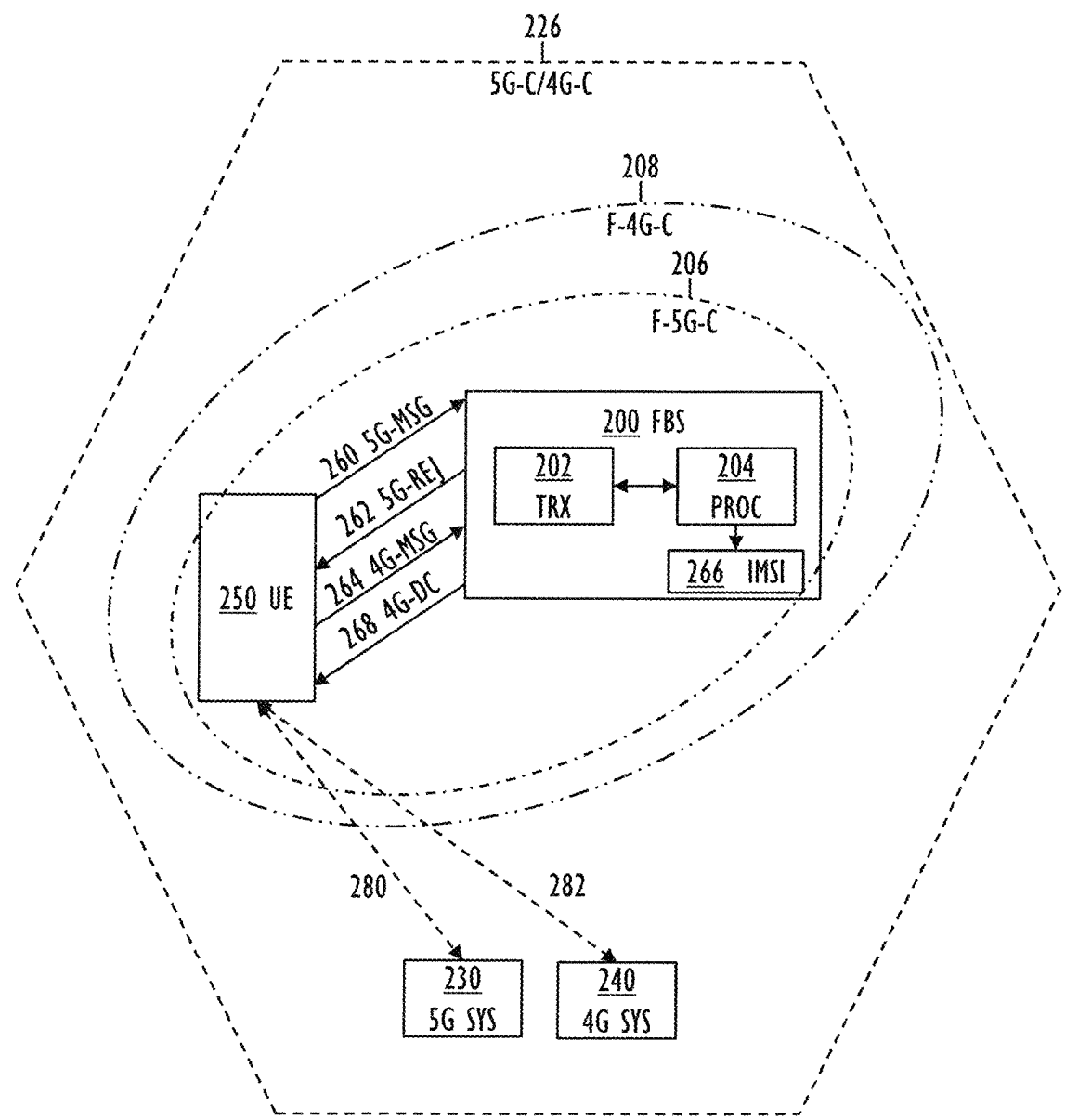

Example embodiments of the present invention are described below, by way of example only, with reference to the accompanying drawings, in which FIG. 1 illustrates example embodiments of a method; and FIG. 2 illustrates example embodiments of a fake base station.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Let us study simultaneously FIG. 1 illustrating example embodiments of a method, and FIG. 2 illustrating example embodiments of a fake base station 200.

The fake base station 200 comprises one or more processing units 204 and one or more radio transceivers 202 configured to implement and perform the method. These parts 202, 204 are configured to implement the communication and processing required by the method. Especially, the parts 202, 204 may implement fake cellular radio cells 206, 208.

The one or more radio transceivers 202 may be implemented with a software-defined radio (SDR) technology. With SDR technology, the one or more radio transceivers 202 contain the required radio frequency parts (for example: an antenna, a low-noise amplifier, band-pass filters, an analog-to-digital converter), but at least some of the traditional hardware components, especially those used for digital signal processing, are implemented with radio interface software running on a processing unit. Described one or more processing units 204 may run the radio interface software, or, alternatively, there may be dedicated processors (not illustrated in FIG. 1) coupled with the one or more radio transceivers 204 for running the radio interface software.

The one or more processing units 204 may be implemented with one or more processors (such as a microprocessor) and computer program code (software), or as an application-specific integrated circuit (ASIC), or as any other way of implementing a device that is capable of processing data.

The fake base station 200 may also be called a false base station, or a stand-alone control apparatus out of the mobile phone systems 230, 240. 'Fake' refers to the fact that the fake base station 200 is not a part of the (real) mobile phone system 230, 240 and it does not provide continuous service for the mobile subscriber apparatuses 250 and their users. The purpose of the fake base station 200 is to perform radio interface functions required for finding out the subscriber identity associated with the mobile subscriber apparatus 250.

FIG. 2 also illustrates that the mobile subscriber apparatus 250 is interoperable with the real fifth and fourth generation mobile phone systems 230, 240, i.e., the mobile subscriber apparatus 250 could gain service 280, 282 from the real mobile phone systems 230, 240 (but the fake base station 200 overrides this, at least momentarily, so that the subscriber identity may be detected).

As the subscriber identity in the fifth generation mobile system 230 is encrypted, the fake base station 200 cannot find out its real identity. Therefore, the fake base station 200 must perform a novel communication sequence to be able to find out an unencrypted subscriber identity.

The encrypted subscriber identity may have been encrypted with a public-key cryptography, also known as asymmetric cryptography, which uses a pair of keys: a public key, which is known by the mobile subscriber apparatus 250, and a private key, which is only known by the fifth generation mobile phone system 230. As only the paired private key holder, i.e., the fifth generation mobile phone system 230, is able to decrypt the encrypted subscriber identity with the private key, the fake base station 200 cannot find out the subscriber identity from the captured messages of the fifth generation mobile phone system 230.

The subscriber identity may be tied to a subscriber identity module (SIM), which may be integrated circuit placed in a reader of the mobile subscriber apparatus 250, or it may be an embedded SIM, or even a software SIM is envisaged.

In an example embodiment, the encrypted subscriber identity comprises a Subscription Concealed Identifier (sometimes known as SUCI).

In an example embodiment, the unencrypted subscriber identity 266 comprises an International Mobile Subscriber Identity (sometime known as IMSI).

Because 5G is the newest cellular technology, 5G mobile subscriber apparatuses 250 will prefer to connect to the 5G cells if available. If 5G cells are available, 5G mobile subscriber apparatuses 250 do not connect to LTE (4G) cells. This will reduce IMSI catch rate using only a fake LTE cell or a fake LTE cell that mimics a non-standalone 5G network. The method catches the IMSI of the 5G mobile subscriber apparatus 250 by "pushing" the 5G mobile subscriber apparatus from the 5G fake cell 206 to the 4G fake cell 208.

In addition to the IMSI catching of the 5G mobile subscriber apparatuses 250, the method makes it also possible to collect statistics of the 5G mobile subscriber apparatuses 250 in the area. The method does not block the 5G service of the 5G mobile subscriber apparatuses 250 but the 5G mobile subscriber apparatuses 250 can continue to use the 5G services normally as soon as the IMSI has been captured.

The method starts in 100.

In an optional operation 102, the fake base station 200 scans radio channels of wireless systems 230, 240 in to find out which channels are in use. In the example embodiment of FIG. 2, a 5G and/or 4G cell 226 implemented by the wireless system 280 and/or 282 is detected.

In an optional operation 104, the fake base station 200 setups a fake radio cell 206 of a fifth generation mobile phone system 230 and a fake cell 208 of a fourth generation mobile phone system 240. This setup comprises selection of radio channels, possibly based on scanning operation 102, and broadcast of system information in order to cause a wireless mobile apparatus 250 to communicate with the fake base station 200. In the example embodiment of FIG. 2, the setup is made so that the mobile subscriber apparatus 250 prefers to camp in the 5G fake cell 206 instead of the real 5G cell 226.

The fake base station 200 may be configured to activate the 5G fake cell 206 with same MCC (Mobile Country Code)+MNC (Mobile Network Code) as the operator 5G network 230, 226 and with a TAI (5G Tracking Area Identity) not used by the operator 5G network 230, 226.

The fake base station 200 may also be configured to activate the fake LTE cell 208 with the same MCC+MNC as the operator 240 and TAC (Tracking Area Code) not used by the operator LTE network 240, 208.

The 5G mobile subscriber apparatus 250 may prefer to connect to any 5G cells of home network, whereby the 5G mobile subscriber apparatus 250 sees the 5G fake cell 206 as attractive and starts a connection to it.

The fake base station 200 is configured to capture in 106 at least one wireless message 260 containing an encrypted subscriber identity of a fifth generation mobile phone system 230 transmitted from the mobile subscriber apparatus 250. The 5G mobile subscriber apparatus may send NAS Registration (TAI update) to the 5G fake cell 206.

The mobile subscriber apparatus 250 is interoperable both with the fifth generation mobile phone system 230 and a fourth generation mobile phone system 240. The fourth generation mobile phone system 240 refers to systems utilizing OFDMA (Orthogonal frequency-division multiple access) multi-carrier transmission with peak data rates ranging from 100 Mbit/s to 1 Gbit/s, such as LTE (Long Term Evolution) and LTE-A starting from year 2009. The fifth generation mobile phone system 230 refers to systems utilizing MIMO (Multiple Input Multiple Output) and additional spectrum (600 MHz to 6 GHz and 24-86 GHz) with peak data rates up to 20 Gbit/s, starting from year 2018. It is noted that these definitions may change as standards develop, but for the purposes of this application an important difference is that in 5G systems the subscriber identity is encrypted with the public-key cryptography, whereas in 4G systems the subscriber identity has no such encryption.

In response to the captured at least one wireless message 260 of the fifth generation mobile phone system 230, the fake base station 200 is configured to transmit a reject message 262 of the fifth generation mobile phone system 230 for the mobile subscriber apparatus 250 in 108. The 5G fake cell 206 may send NAS Registration Reject with 5GMM (5G Mobility Management) cause "N1 mode not allowed". This 5GMM commands 5G mobile subscriber apparatus 250 to disable N1 mode. The 5G fake cell 206 may then close the connection to the 5G mobile subscriber apparatus 206. The 5G mobile subscriber apparatus 250 then closes N1 mode of the SC mobile and starts searching LTE cells 208 for the same MCC+MNC. The 5G mobile subscriber apparatus 250 sees the LTE fake cell 208 as attractive and starts a connection to it. The 5G mobile subscriber apparatus 250 then connects to the 4G fake cell 208.

In an example embodiment, the fake base station 200 may be configured to generate a distance estimate and/or a location estimate related to the mobile subscriber apparatus 250, based on radio parameters like measured timing advance of the mobile subscriber apparatus 250, for example. For this purpose, the fake base station 200 may be configured to keep the mobile subscriber apparatus 250 connected to the 5G fake cell 206 for a maximum allowed time. This may be achieved by the fake base station 200 starting an identity request procedure multiple times to request SUCI to keep the mobile subscriber apparatus 250 connected to the 5G fake cell 206 for the maximum allowed time before sending the reject message 262. See PLMN selection after reject with N1 mode disable cause, for example, in 3GPP standard 3GPP TS 23.122 (3rd Generation Partnership Project; Technical Specification Group Core Network and Terminals; Non-Access-Stratum (NAS) functions related to Mobile Station (MS) in idle mode). The distance estimate and/or the location estimate may also be generated (or improved) during the connection of the mobile subscriber apparatus to the 4G fake cell 208. Note that the distance estimate and/or the location estimate obtained during 4G communication may be used to correlate the 5G communication attempt to the LTE connection (based on the corresponding estimates made during the 5G communication).

After transmitting the reject message 262, the fake base station 200 is configured to capture at least one wireless message 264 of the fourth generation mobile phone system 240 transmitted from the mobile subscriber apparatus 250 in 110. The LTE fake cell 208 may request IMSI from the 5G mobile subscriber apparatus 250, and the 5G mobile subscriber apparatus 250 sends IMSI to the LTE fake cell 208.

The fake base station 200 is configured to detect an unencrypted subscriber identity (such as IMSI) 266 from the at least one captured wireless message 264 of the fourth generation mobile phone system 240 in 112.

After detecting the unencrypted subscriber identity 266, the fake base station 200 is configured to transmit a disconnect message 268 of the fourth generation mobile phone system 240 for the mobile subscriber apparatus 250 in 114. The LTE fake cell 208 may send NAS Tracking Area Update Reject ("No suitable cell in TAC"). The 5G mobile subscriber apparatus 250 goes away from the LTE fake cell 208 and starts searching for operator LTE cells 226. When an internal timer of the 5G mobile subscriber apparatus 250 expires, the 5G mobile subscriber apparatus 250 enables N1 mode and camps back to the operator 5G network 230.

The method ends in 118 after the processing is finished, or, the method may loop 116 back to the operation 106 to receive further messages from some other mobile apparatus.

The fake base station 200 may also implement 3G and/or 2G fake cells (not described in FIG. 2) in order to utilize their known weaknesses for further operations like requesting IMEI (International Mobile Equipment Identity) or eavesdropping calls, for example. In such a case, after the mobile subscriber apparatus 250 is forced to camp in the 4G fake cell 208, it may further be controlled to camp in 3G or 2G fake cell for further surveillance operations.

It will be obvious to a person skilled in the art that, as technology advances, the inventive concept can be implemented in various ways. The invention and its embodiments are not limited to the example embodiments described above but may vary within the scope of the claims.

The invention claimed is:

1. A method comprising:
    capturing, in a fake base station, at least one wireless message containing an encrypted subscriber identity of a fifth generation mobile phone system transmitted from a mobile subscriber apparatus interoperable both with the fifth generation mobile phone system and a fourth generation mobile phone system;
    in response to the captured at least one wireless message of the fifth generation mobile phone system, transmitting, by the fake base station, a reject message of the fifth generation mobile phone system for the mobile subscriber apparatus;
    after transmitting the reject message, capturing, in the fake base station, at least one wireless message of the fourth generation mobile phone system transmitted from the mobile subscriber apparatus;
    detecting, by the fake base station, an unencrypted subscriber identity from the at least one captured wireless message of the fourth generation mobile phone system;
    after detecting the unencrypted subscriber identity, transmitting, by the fake base station, a disconnect message of the fourth generation mobile phone system for the mobile subscriber apparatus;
    generating a distance estimate related to the mobile subscriber apparatus based on radio parameters of at least one of the fourth generation mobile phone system, and the fifth generation mobile phone system; and
    keeping the mobile subscriber apparatus connected to a fifth generation fake cell implemented by the fake base station for a maximum allowed time before transmitting the reject message.

2. The method of claim 1, wherein the encrypted subscriber identity comprises:
    a Subscription Concealed Identifier.

3. The method of claim 1, wherein the unencrypted subscriber identity comprises:
    an International Mobile Subscriber Identity.

4. A fake base station comprising:
    one or more processing units and one or more radio transceivers configured to perform the following:
    capturing at least one wireless message containing an encrypted subscriber identity of a fifth generation mobile phone system transmitted from a mobile subscriber apparatus interoperable both with the fifth generation mobile phone system and a fourth generation mobile phone system;
    in response to the captured at least one wireless message of the fifth generation mobile phone system, transmitting a reject message of the fifth generation mobile phone system for the mobile subscriber apparatus;
    after transmitting the reject message, capturing at least one wireless message of the fourth generation mobile phone system transmitted from the mobile subscriber apparatus;
    detecting an unencrypted subscriber identity from the at least one captured wireless message of the fourth generation mobile phone system;
    after detecting the unencrypted subscriber identity, transmitting a disconnect message of the fourth generation mobile phone system for the mobile subscriber apparatus;
    generating a distance estimate related to the mobile subscriber apparatus based on radio parameters of at least one of the fourth generation mobile phone system, and the fifth generation mobile phone system; and
    keeping the mobile subscriber apparatus connected to a fifth generation fake cell implemented by the fake base station for a maximum allowed time before transmitting the reject message.

5. The fake base station of claim 4, wherein the encrypted subscriber identity comprises:
    a Subscription Concealed Identifier.

6. The fake base station of claim 4, wherein the unencrypted subscriber identity comprises:
    an International Mobile Subscriber Identity.

* * * * *